United States Patent
Eugster

(10) Patent No.: US 6,711,988 B1
(45) Date of Patent: Mar. 30, 2004

(54) ESPRESSO MACHINE WITH AN INFUSION PISTON DISPLACEABLE IN AN INFUSION CYLINDER

(75) Inventor: Arthur Eugster, Romanshorn (CH)

(73) Assignee: Eugster Frismag AG, Romanshorn (CH)

(*) Notice: Subject to any disclaimer, the term of this patent is extended or adjusted under 35 U.S.C. 154(b) by 0 days.

(21) Appl. No.: 10/089,863

(22) PCT Filed: Oct. 5, 2000

(86) PCT No.: PCT/EP00/09724

§ 371 (c)(1),
(2), (4) Date: Apr. 5, 2002

(87) PCT Pub. No.: WO01/24670

PCT Pub. Date: Apr. 12, 2001

(30) Foreign Application Priority Data

Oct. 6, 1999 (DE) .................................. 299 17 586 U

(51) Int. Cl.⁷ .................................................. A47J 3/00
(52) U.S. Cl. .................. 99/299; 99/302 P; 99/283
(58) Field of Search ................. 99/302 P, 287, 99/302 R, 299, 283

(56) References Cited

U.S. PATENT DOCUMENTS 5,337,652 A * 8/1994 Fischer et al. ............ 99/299 X
5,473,973 A * 12/1995 Cortese .................... 99/299 X

FOREIGN PATENT DOCUMENTS

| DE | 2439417 A1 | 10/1975 |
| DE | 9005650 U1 | 9/1990 |
| DE | 19647385 C1 | 8/1998 |
| DE | 19848370 A1 | 4/1999 |
| EP | 0 270 141 A1 | 6/1988 |
| EP | 0564399 A | 10/1993 |
| EP | 0756842 A | 2/1997 |
| EP | 0885582 A | 12/1998 |
| EP | 0948927 A | 10/1999 |

* cited by examiner

Primary Examiner—Reginald L. Alexander
(74) Attorney, Agent, or Firm—Venable LLP; Robert Kinberg

(57) ABSTRACT

An espresso machine is provided with an infusion piston displaceable inside an infusion cylinder. The infusion piston is force-connected to a spring and to a device for activating the infusion piston and, in a first position, tightly encloses ground coffee inside an infusion chamber of the infusion cylinder between itself and an outlet sieve. A pressurized water inlet is connected to the infusion chamber, the infusion piston is automatically pushed by the pressure of the infusion water flowing into the infusion cylinder and counter to a spring force to a second predetermined position, thereby expanding the infusion chamber, whereupon during a pressure drop inside the infusion chamber the infusion piston is returned automatically to the first position. The infusion piston can essentially be displaced proportional to a pressure increase inside the infusion chamber, caused by the infusion water flowing in, until it reaches a nominal opening pressure for a frothing valve that closes off the infusion chamber in a downstream direction.

2 Claims, 1 Drawing Sheet

ESPRESSO MACHINE WITH AN INFUSION PISTON DISPLACEABLE IN AN INFUSION CYLINDER

BACKGROUND OF THE INVENTION

The invention relates to an espresso machine with an infusion piston displaceable inside an infusion cylinder, The infusion piston of a known espresso machine, in particular for household use, is spring-connected with the aid of a rod to a motorized activating device. The rod is positioned inside a vertically displaceable sleeve with tubular section (EP 0 270 141 A1). The tubular section, among other things, is connected via a tension spring to the pin of a cam disk driven by a gear motor. The spring is arranged and dimensioned such that the ground coffee filled into the infusion chamber of the infusion cylinder is essentially compressed steadily and independent of the amount of ground coffee by the gear motor. An infusion-water inlet empties into the infusion cylinder, connected to the infusion chamber with a line through which infusion water flows, via a filter with ring-shaped opening that operates jointly with a displaceable locking piece to release a passage. Under pressure from the infusion water flowing into the infusion cylinder or infusion chamber, the infusion piston is held in the position where the ground coffee is compressed. An outlet sieve is arranged in the area of the infusion cylinder bottom or the infusion chamber formed therein, which can be raised following the infusion operation in order to push out the cake formed with the ground coffee.

With espresso machines of this type the ground coffee is compressed to obtain a good froth that helps determine the espresso quality. The compressed, ground coffee acts as flow-control section for the infusion water, thus causing an infusion pressure in the infusion cylinder that extracts the froth-forming distilled oils from the ground coffee.

It is furthermore known that the quality of the brewed espresso can be improved by allowing a certain pressure to build up inside the infusion chamber before the finished espresso can flow out of the infusion chamber. The relatively high infusion pressure of the infusion water flowing into the infusion chamber acts upon the moistened ground coffee before the actual leaching out of the ground coffee. To achieve this infusion pressure, a frothing valve that closes off the infusion chamber in downstream direction is known. This valve opens up only when a nominal opening pressure is reached in the infusion chamber to allow the finished espresso to flow out (see for example EP 0 756 842 B1). Otherwise, this known espresso machine is designed with a lower part fixedly secured to the housing and a carousel-type upper part, which rotates on a circular path of 360°. The upper part comprises a control mechanism for producing high-quality espresso in a simple, yet highly safe operation. With this espresso machine, an infusion piston that forms a component of the upper part is aligned in one rotational position axial to an infusion chamber or compartment, so that it can be lowered into or lifted out of this chamber. The individual steps involve filling in the ground coffee, then lowering the infusion piston with an infusion sieve to the infusion position inside the infusion chamber until the infusion piston that impacts with the ground coffee has compressed the ground coffee. In the process, snap-in elements become effective, which operate jointly with a lowering lever and thus fix the position of the infusion piston before and after the infusion water flows into the infusion chamber through the holes in the lifting piston. The snap-in elements comprise several traps to permit a compressing of different amounts of coffee. A lifting piston is arranged above the bottom of the infusion chamber, which is provided with holes for allowing the infusion water to flow from the infusion water nozzle, installed in the bottom, into the lower part of the infusion chamber. The lifting piston is positioned displaceable and can be moved up and down by rotating the upper part. Following the infusion of the espresso, the lifting piston can thus be raised during the rotation of the upper part to a different angular position, to the upper edge of the infusion chamber. From that position, the cake formed with coffee grounds, which remains after the infusion operation is complete can be pushed out to the side with a removal element. Prior to that and owing to the fact that the ground coffee is enclosed tightly between perforated lifting piston and infusion sieve, little residual water remains in the cake formed with coffee grounds following the infusion operation. This water is also referred to as coffee residue.

SUMMARY OF THE INVENTION

The disadvantage of above-mentioned espresso machines, however, is that not all areas of the ground coffee are sufficiently moistened as a result of the strong compressing of the ground coffee or the counter pressure generated by the frothing valve, thus resulting in insufficient extraction of the distilled oils in those areas. An additional disadvantage of espresso machines having frothing valves is that once the nominal opening pressure is reached and, accordingly, the frothing valve is opened, the infusion water will suddenly carve a channel and rush along the shortest route toward the espresso outlet. In that case, some areas of the ground coffee are leached out only insufficiently. Undesirable breakthrough channels of the infusion water can form in the ground coffee even with relatively low pressures and in the absence of a frothing valve.

A known espresso machine of the generic type described in the introductory section to the specification does not have a frothing valve, but a spring-loaded infusion piston. The infusion piston is arranged inside the infusion chamber such that it can be displaced by the pressurized infusion water and counter to the resetting force of the spring toward a bottom of an infusion chamber, thus expanding the infusion chamber and finally closing off an espresso outlet in the bottom (EP 0 948 927 A1). The infusion piston is provided on the top with a filter for holding the ground coffee and on the bottom with a piston rod. The outflow of espresso through the individual openings in the infusion piston must for all practical purposes be stopped with the aid of the bottom part, particularly a raised section on the bottom, if the infusion piston rests on the bottom or the raised area on the bottom. This is designed to achieve a complete moistening of the ground coffee during the infusion phase. However, the infusion chamber is not closed off immediately after the infusion water flows into the infusion chamber, but only after sufficient pressure has built up, so that the infusion piston is mostly pressed against the bottom. At least until this time, infusion water can flow from the espresso outlet in an undesirable manner. Even following that, the seal is not ensured because of the unavoidable sediments from the cake formed with coffee grounds and the incompressible water between the underside of the infusion piston and the bottom of the infusion chamber. At the completion of the infusion phase and once the flow of hot water under pressure has been turned off, the resetting force of the spring that returns the infusion piston and cake formed with coffee grounds therefore cannot be selected very high.

It is the object of the present invention to develop an espresso machine of the aforementioned type, which avoids the above disadvantages and reliably causes an even moistening, pressing-out and leaching-out of all areas of the ground coffee in the infusion cylinder. This is designed to achieve the best possible use of the ground coffee and an optimized froth. In the process, the sealing of the infusion chamber is to be improved as well, starting from the time when the infusion water first flows into the infusion chamber to the end of the infusion phase.

This object is solved for an espresso machine of the aforementioned type with the features listed below.

For the solution according to the invention, the compressing of the ground coffee by the infusion piston occurs prior to the actual infusion operation, wherein the infusion piston with water distributor can rest on the ground coffee. This compressing position of the infusion piston before the start of the infusion operation is referred to as first position. For this, the infusion chamber is closed off pressure-tight and watertight by the infusion piston and in downstream direction by a frothing valve. The spring is dimensioned such that the infusion cylinder is moved to a second position by the pressure of the infusion water flowing into the infusion chamber and counter to the spring force of this spring. In this second position, the infusion chamber volume is increased to a predetermined maximum value, so that no local breakthroughs for the infusion water occur in the ground coffee in the expanding infusion chamber. Rather, the ground coffee is evenly moistened, pressed out and leached out as a result of its mobility, particularly the swirling in the floating infusion, before the opening of the frothing valve upon reaching the nominal opening pressure. The infusion piston is thus moved automatically back to the first position as a result of the energy stored in the spring, so that the coffee residue or the cake formed with ground coffee has the desired dryness following the completion of the infusion operation.—No additional active control elements are therefore required to control the infusion piston movement between a first position (compressing position) and a second position and back to the first position before the cake formed with coffee grounds is removed.

The infusion piston function is a result of the arrangement and dimensioning of the means, which exert a force onto the infusion piston during the infusion operation. That is to say, it is based on the infusion pressure inside the infusion chamber, as well as the effective infusion piston surface upon which this pressure acts, the spring and any other elements that may exist and may influence the forces attacking the infusion piston. The frothing valve contributes to the automatic displacement of the infusion piston. This valve helps determine the maximum adjustment of the infusion piston and thus the expansion of the infusion chamber until a nominal opening pressure is achieved. Mechanical stops or additional means for limiting the infusion piston lift are thus not necessary. The nominal opening pressure can be adjusted, for example, to approximately 6 bar.

A particularly compact, reliable and structurally uncomplicated arrangement of a compression spring that acts upon the infusion piston is disclosed in this specification.

Espresso machines with a bottom part secured to the housing and a top part 1hat can rotate relative to the bottom part along a circular track of 360° can be designed without problem to include the intended, automatic displacement of the infusion piston in the infusion cylinder during the infusion operation. The infusion piston as component of the upper part can be lowered into and removed from the infusion chamber in an angular position of the upper part arid with the aid of a lowering lever. An upward and downward movement of a lifting piston with perforated bottom is forcibly controlled through the rotational movement of the upper part. The lifting piston can be raised in the lower part of the infusion chamber to the upper edge of the infusion chamber where a cake formed with coffee grounds can be removed to the side with a removal element. This type of design; is shown in detail in the above-mentioned EP 0 756 842 B1. As a result, the advantages of an uncomplicated, operationally safe control mechanism can be utilized, wherein this control mechanism does not need to be expanded for the infusion piston movement during the infusion operation.

BRIEF DESCRIPTION OF THE DRAWINGS

Another exemplary embodiment of the invention is shown in the following with the aid of a drawing and a Figure, showing in.

DETAILED DESCRIPTION OF EMBODIMENTS OF THE INVENTION

Figure 1:
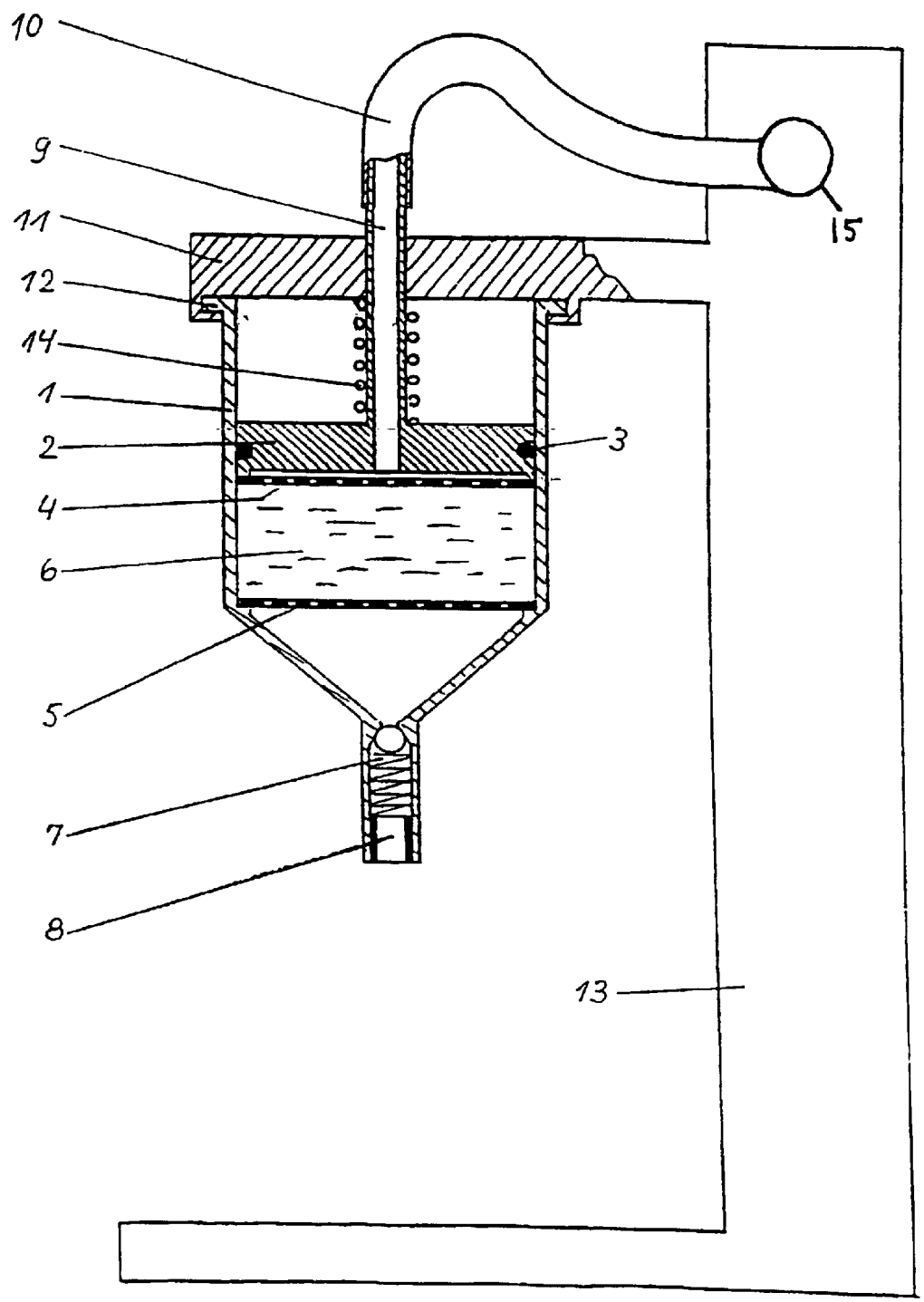
FIG. 1 A longitudinal section through a portion of an espresso machine, which shows an extremely simplified longitudinal section of an infusion head.

Reference numeral 1 in FIG. 1 shows an infusion cylinder with an infusion piston 2 that is positioned such that it can be displaced. The infusion piston 2 is sealed with a piston seal 3 against an inside wall of the infusion cylinder 1. A water distributor 4, which can be designed as sieve and moved with the infusion piston 2, is located on one underside of the infusion piston 3. An outlet sieve 5 is positioned opposite, in a lower portion of the infusion cylinder 1. An infusion chamber 6 with variable volume is defined by the underside of the infusion piston with displaceable water distributor 4, the outlet sieve and the inside wall section of the infusion cylinder that is located between the infusion piston 2 or the water distributor 4 and the outlet sieve.

Below the outlet valve, a frothing valve 7 with a nominal opening pressure of approximately 6 bar is arranged in a flow path extending downstream from the infusion chamber 6 to an espresso outlet 8. The outlet sieve 5 can be realized as perforated bottom.

A tubular infusion water inlet 9 is connected to a flexible water hose 10, which leads to an infusion water pump 15. The infusion water inlet is designed as tube-shaped piston rod, which is positioned displaceable inside an infusion cylinder support 11. The infusion water inlet changes over to a bore in the infusion piston 2, which is connected with a line carrying infusion water to the infusion chamber 6 below the water distributor 4.

A compression spring 14 is installed between a top part of the infusion piston 2 that is not designated and a bottom part of the infusion cylinder support 11, which is also not designated.

The compression spring 14 is dimensioned such that in the first position for the infusion water piston, shown in FIG. 1, at normal pressure in the infusion water inlet, it compresses the ground coffee filled into the infusion chamber 6 to the desired degree. However, once infusion water is forced at the start of the infusion operation through the flexible water hose 10, the infusion water inlet 9 and the water distributor 4 into the infusion chamber 6, the piston moves under pressure upward to a predetermined second position. The infusion chamber 6 volume is consequently enlarged to a desired degree by the lifting of the infusion piston 2 with the water distributor 4. The infusion piston 2 is raised counter to the spring force of compression spring 14 until the nominal opening pressure of the frothing valve 7 is reached. Until then, the ground coffee can spread out in the expanded infusion chamber 6 as a result of the swirling caused by the pressure of the infusion water flowing into the infusion chamber 6, such that the ground coffee is evenly moistened, is subsequently pressed out and then leached out. The second infusion piston 2 position, reached and maintained until the inside pressure in the pressure chamber has increased to the nominal opening pressure for the frothing valve 7, can be defined, for example, by the compression spring 14 characteristic in relation to the effective pressure surface on the underside of the infusion piston 2 or by a mechanical stop.

Once the nominal opening pressure of the frothing valve in the infusion chamber 6 is reached, the inside pressure there breaks down and the compression-spring 14 compresses the leached-out coffee grounds inside the decreasing infusion chamber 6 with the aid of the infusion piston 2 and the water distributor 6 [sic] until the first position of the infusion piston 2 is reached once more.

For the exemplary embodiment, the infusion cylinder 1 that is attached with a bayonet joint 12 to the infusion cylinder support 11 can be removed again, wherein the infusion piston 2 with water distributor 4 and the compression spring 14 remain attached to the infusion cylinder support 11. The ground coffee can be filled into the removed infusion cylinder 1 prior to preparing the espresso. Following the infusion operation, the infusion cylinder 1 can be taken off once more and the cake formed with coffee grounds removed.

Parts Legend

1 infusion cylinder
2 infusion piston
3 piston seal
4 water distributor
5 outlet sieve (perforated bottom)
6 infusion chamber
7 frothing valve
8 espresso outlet
9 infusion water inlet
10 flexible water hose
11 infusion cylinder support
12 bayonet joint
13 espresso machine
14 compression spring

What is claimed is:

1. An espresso machine with an infusion piston displaceable inside an infusion cylinder, which infusion piston is force-connected to a spring and to a device for activating the infusion piston and, in a first position, tightly encloses ground coffee inside an infusion chamber of the infusion cylinder between itself and an outlet sieve, wherein a pressurized water inlet is connected to the infusion chamber, the infusion piston (2) is automatically pushed by the pressure of the infusion water flowing into the infusion cylinder (1) and counter to a spring force to a second predetermined position, thereby expanding the infusion chamber, whereupon during a pressure drop inside the infusion chamber (6) the infusion piston (2) is returned automatically to the first position, characterized in that the infusion piston (2) can essentially be displaced proportional to a pressure increase inside the infusion chamber (6), caused by the infusion water flowing in, until:it reaches a nominal opening pressure for a frothing valve (7) that closes off the infusion chamber (6) in downstream direction.

2. An espresso machine according to claim 1, characterized in that the spring is a compression spring (14), arranged coaxial to the infusion piston (2) above the infusion cylinder (1), between this piston and an element that is fixedly installed relative to the infusion cylinder (1).

* * * * *